March 16, 1954     B. F. LINTON     2,672,126
HOOF TRIMMING APPARATUS FOR CATTLE CHUTES
Filed July 26, 1952     2 Sheets-Sheet 1
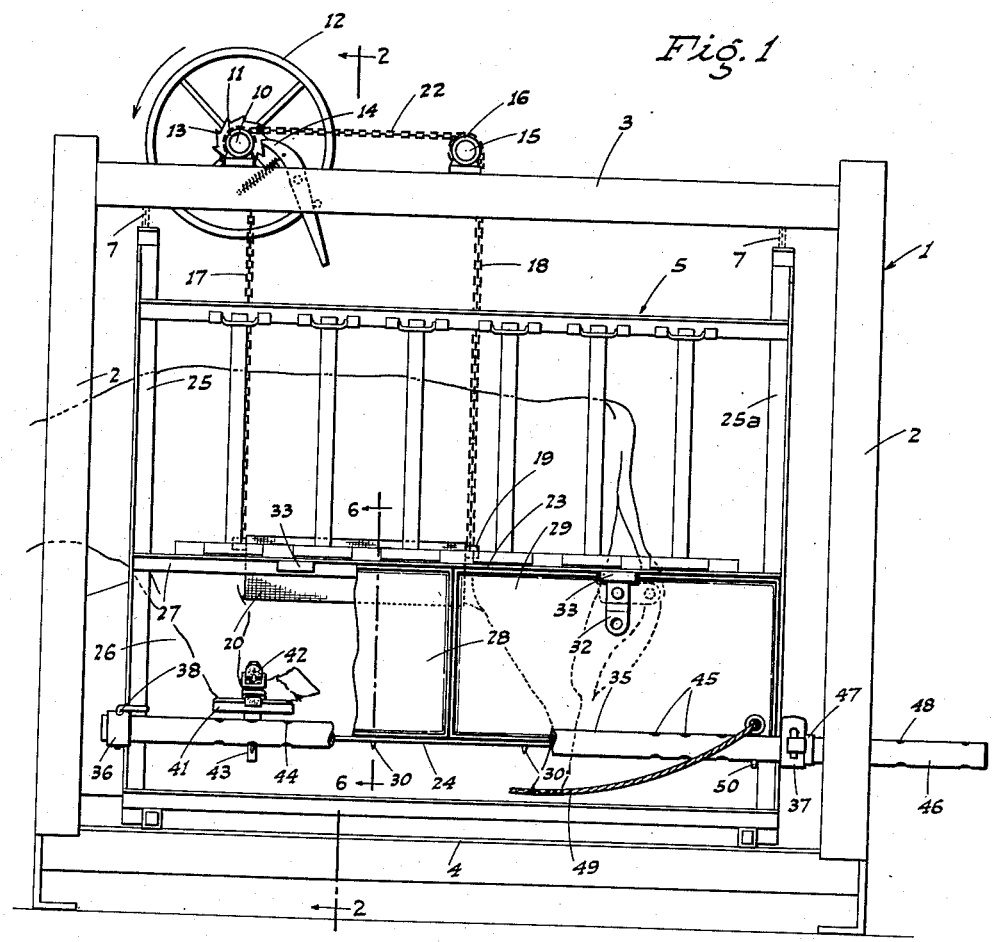
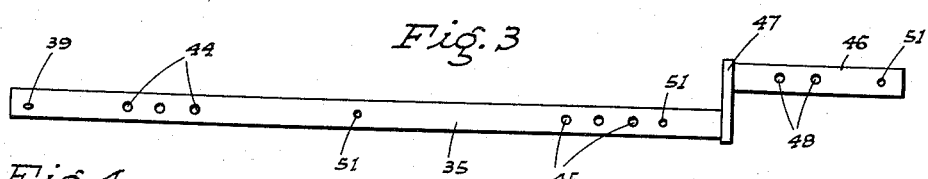
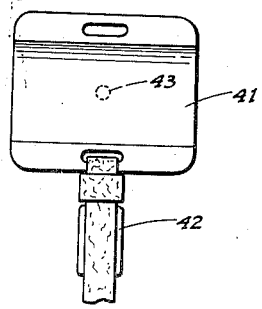
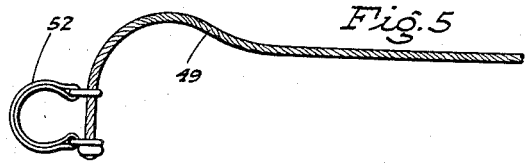
INVENTOR
Bert F. Linton
ATTYS March 16, 1954  B. F. LINTON  2,672,126
HOOF TRIMMING APPARATUS FOR CATTLE CHUTES
Filed July 26, 1952  2 Sheets-Sheet 2
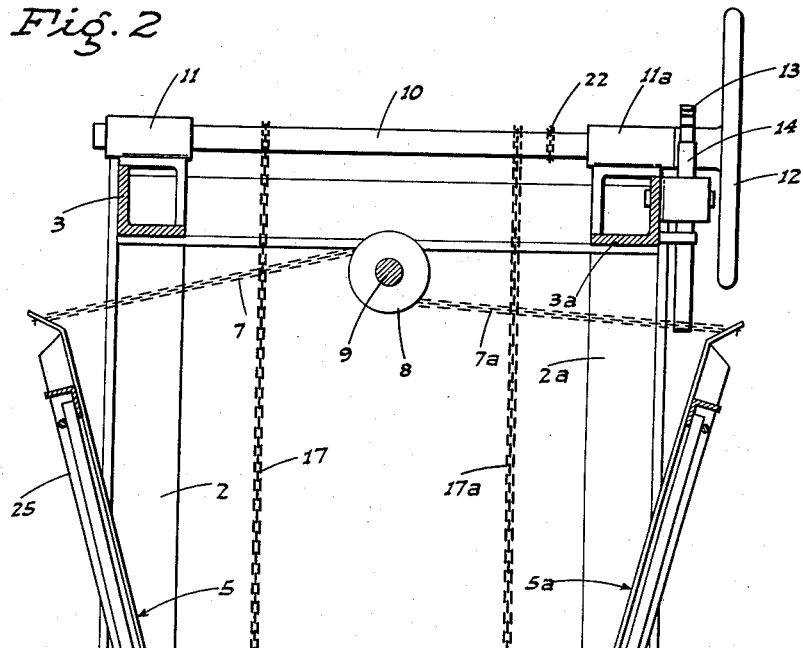
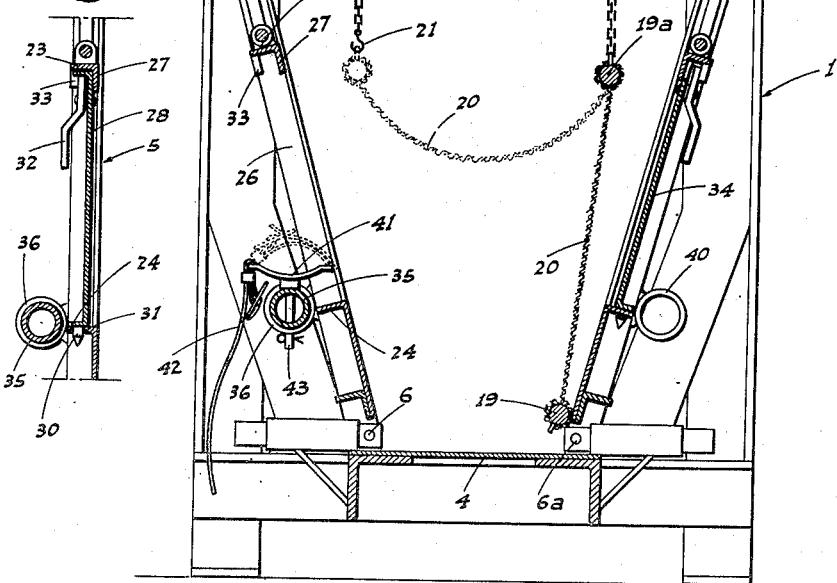
INVENTOR
Bert F. Linton
BY
ATTYS Patented Mar. 16, 1954

2,672,126

UNITED STATES PATENT OFFICE 2,672,126

HOOF TRIMMING APPARATUS FOR CATTLE CHUTES

Bert F. Linton, Visalia, Calif.

Application July 26, 1952, Serial No. 301,136

1 Claim. (Cl. 119—100)

This invention relates to cattle chutes of the type used for handling a single animal for the purpose of performing various veterinary operations thereon, and particularly represents improvements over, or additions to, the chute shown in my U. S. Patent No. 2,510,703, dated June 6, 1950.

The principal object of my invention is to equip the chute with apparatus which will facilitate trimming the hoofs of the animal.

The apparatus includes an adjustable platform on which a hoof of the animal may rest in a trimming position when the lower portion of the leg is bent, and in connection with such a platform, it is another object of the invention to provide, as a part of the apparatus, a vertically adjustable sling arranged to lift the animal after the latter has walked into the chute, so that the animal is suspended clear of the floor of the chute, making it easier for the operator to bend each leg in turn and place the hoof thereof on the platform in position for trimming. The apparatus also includes a manually operated leg engaging element which may be pulled by the operator from outside the chute so as to guide the hoof onto the platform and enable such hoof to be held in position while the hoof is being strapped against movement on the platform.

A further object of the invention is to construct the apparatus so that only one leg at a time will be exposed to the outside of the chute, thus avoiding the possibility of the animal kicking the operator while he is working on one hoof.

Still another object of the invention is to provide a hoof trimming apparatus for cattle chutes which is practical, reliable, and durable, and one which is exceedingly effective for the purpose for which it is designed.

These objects are accomplished by means of such structure and relative arrangement of parts as will fully appear by a perusal of the following specification and claim.

In the drawings:

Fig. 1 is a side elevation of an animal chute, showing the hoof trimming apparatus mounted thereon as in operation, and partly broken away.

Fig. 2 is a sectional elevation, somewhat enlarged, taken on line 2—2 of Fig. 1, but showing the lifting sling in inoperative position.

Fig. 3 is a plan view of the platform supporting bar, detached.

Fig. 4 is an enlarged plan view of the platform detached.

Fig. 5 is a fragmentary view of the manually operated leg engaging and pulling unit.

Fig. 6 is a fragmentary vertical section on line 6—6 of Fig. 1.

Referring now more particularly to the characters of reference on the drawings, the animal chute, to which the hoof trimming apparatus is applied, is constructed generally as shown in the above identified patent and includes an upstanding rectangular frame 1 having transversely spaced end posts 2 and 2a connected at the top by longitudinal beams 3 and 3a. An animal-supporting longitudinal floor 4 is disposed near the bottom of the frame.

The chute also includes sidewall units 5 and 5a pivoted at their lower end on the frame 1 at opposite sides of the floor, as at 6 and 6a, and connected at the top, and at each end, by chains 7 and 7a wound on a central drum 8 on a longitudinal rotary shaft 9 supported by the frame just below beams 3 and 3a. The sidewalls are thus mounted for lateral swinging movement about their pivots so that a squeezing pressure may be applied against the sides of an animal.

All the above described parts are the same, as a whole, as those shown in Patent No. 2,510,703, and the hoof trimming apparatus, which is the subject matter of this invention, is built into or mounted on such chute parts in the following manner:

Adjacent the rear or exit end of the chute is a cross shaft 10 journaled in bearings 11 and 11a mounted on the beams 3 and 3a. At one end, and beyond one side of the chute, shaft 10 is provided with a hand wheel 12 and a ratchet wheel 13 engaged by a spring-held manually released pawl 14 mounted on the adjacent beam 3a.

Further forward on the frame 1 is another cross shaft 15 on the same level as, and parallel to, shaft 10, and journaled in bearings 16 mounted on beams 3 and 3a.

Transversely spaced chains 17 and 17a, or the like, depend from shaft 10, and similar chains 18 depend from shaft 15. At their lower end, chains 17 and 17a are connected to one end of the top side bars 19 and 19a of a flexible cradle or sling 20 of canvas, or the like. Similarly, the chains 18 are connected to the other end of bars 19 and 19a.

The chain 17, as well as the corresponding chain 18, is detachably connected to the bar 19 by a hook 21, or the like, as indicated in Fig. 2.

The shafts 10 and 15 form winch drums about which the chains wrap to raise the sling upon rotation of both shafts simultaneously. To accomplish such simultaneous rotation, the shafts are connected by a chain 22, or the like, which is already wrapped several times about shaft 15 when the sling is in a lowered position. When the hand wheel 12 is turned, in the one direction which the normally engaged pawl 14 allows, shafts 10 and 15 will be rotated, the latter by the unwinding action of chain 22, and the sling will be lifted evenly at both ends. Lowering of the sling, unless desired, is, of course, prevented by pawl 14. The lowermost position of the sling is such that it will clear the underside of the body of an animal standing in the chute.

Intermediate its top and bottom, sidewall 5 is formed with vertically spaced lateral flanges 23 and 24 extending the full length of the gate between the end posts 25 and 25a thereof and forming a rectangular opening 26 through the gate; flange 23 being backed by a depending flange 27.

Normally filling the openings is a pair of identical panels 28 and 29, resting on flange 24 and abutting against flange 27. Each panel is provided with depending lugs 30 each fitting in a matching hole 31 in flange 24. Adjacent its upper edge, each panel is provided with a swivelly mounted latch finger 32 adapted at its upper end to engage behind a retaining lug 33 depending from flange 23. The opposite sidewall 5a is similarly provided with removable panels, one of which is shown at 34.

Extending alongside sidewall 5, on the outside and adjacent the level of flange 24, is a bar 35 removably seated at the exit end of the chute in a sleeve 36 mounted on the adjacent end post 25 of said sidewall and in a saddle 37 mounted on the other end post 25a of the sidewall as shown in Fig. 1. The bar 35 is circular and tubular for inexpensive manufacture, and to prevent rotation and undesired longitudinal movement of the bar, a removable retaining pin 38 is passed through the sleeve 36 and through a hole 39 in the bar.

As stated, said bar is removable from association with sidewall 5, so that the same bar may be used in connection with sidewall 5a, which is also provided with the necessary bar supporting members, such as socket 40.

The bar 35 forms the mounting means for a hoof engaging platform 41, somewhat concave, lengthwise of the chute, on its upper surface. A strap and buckle unit 42 is mounted on the platform, at its side edges, so that the leg of an animal adjacent the hoof may be strapped down onto the platform, as indicated in Fig. 1.

The platform is swivelly supported from the bar 35 for adjustment lengthwise thereof to different positions relative to the panels 28 and 29. To this end, a central pin 43 depends from the platform, which pin is adapted to turnably depend through any one of a row of holes 44 located in the bar intermediate the ends of panel 28 (for front hoof support) or a row of holes 45 located in the bar intermediate the ends of panel 29, for rear hoof treatment. Since the platform may swivel horizontally, the concavity thereof may be disposed in a position most convenient to the leg of the animal.

The bar and platform, when mounted thereon, are so disposed on the sidewall that the platform will lie above the lower edge of the opening 26 and projects laterally inward to adjacent the inner face of the sidewall, as shown in Fig. 2.

In order that the rear hoofs of an extra long or long-legged animal may be handled on the apparatus, the bar 35 is provided with a longitudinal extension 46 projecting beyond saddle 37 and offset laterally inward to avoid the adjacent frame post 2 or 2a when the sidewall is swung out. The extension 46 is rigidly connected to bar 35 by a transverse connecting arm 47, and is provided with vertical holes 48 to receive the platform pin 43.

In operation, before an animal is placed in the chute, the sling is lowered and the bar 19 is disengaged from the suspension chains so that the sling hangs free, as shown in Fig. 2.

When the animal is standing in position in the chute, in facing relation to the exit end thereof, the sidewall units are brought together to confine the animal against appreciable lateral movement, and assuming that the left front hoof of the animal is the one to be treated, the front left panel 28 is removed. This exposes the depending sling 20, which is then pulled under the body of the animal, and its initially free side engaged with the suspension chains 17 and 18. The hand wheel 12 is then manipulated to lift the sling—and the animal—until the hoofs are clear of the floor the desired distance.

The left foreleg of the animal is thus exposed in the portion of opening 26, from which the panel 28 has been removed, and said foreleg may then be bent back and its lower portion rested on the platform 41, which is first adjusted along the bar 35 to the position most suitable for the particular animal at hand.

In order to facilitate the handling of the leg, I provide a pull rope 49 connected at one end to a pin 50 adapted to seat in any of a number of holes 51 in the bar 35 and its extension 46; and at the other end to a leather loop 52. This loop is adapted to be spread so as to receive the hoof therethrough, and is arranged on the rope so that when the latter is pulled, the loop will close about the leg, adjacent the hoof, and enable the leg to be pulled back over the platform 41 and held there while the strap 42 is being clamped about the leg to hold the same against movement on the platform. The rope may then be slackened and the loop removed from the leg so that said loop is not in the way of a hoof trimming operation.

When it is desired to trim the left rearleg hoof, panel 28 is replaced and panel 29 is removed, the platform 41 being also, of course, shifted back so that its mounting pin 43 engages one of the holes 45.

When the right hoofs are to be trimmed, the bar 35 is withdrawn from sleeve 36 and saddle 37 and mounted, in an inverted position, in the similar members on sidewall 5a. The various platform-pin holes extend through the bar, as shown in Fig. 1, so that the holes will still be in a pin-receiving position when the bar is inverted.

From the foregoing description it will be readily seen that there has been produced such a device as substantially fulfil's the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In an animal chute, which includes an upstanding rectangular frame, an animal supporting floor and adjustable animal retaining sidewalls upstanding from the floor on opposite sides thereof; means on each sidewall to form a longitudinal opening relatively close to the bottom of the sidewall and extending substantially the length thereof, short horizontal sleeves rigid with and on the outside of each sidewall at the ends thereof at a level adjacent the lower edge of the opening, a bar removably engaged with and supported by the sleeves of either wall by longitudinal movement of the bar from one end of said wall, and a hoof supporting unit removably mounted on the bar; said bar at one end, beyond the adjacent sleeve, being provided with a longitudinal extension laterally offset inwardly of the chute to removably support the hoof supporting unit.

BERT F. LINTON.

References Cited in the file of this patent

UNITED STATES PATENTS

| Number | Name | Date |
|---|---|---|
| 36,920 | Sinclair | Nov. 11, 1862 |
| 144,963 | Ditch | Nov. 25, 1873 |
| 316,558 | McCreight | Apr. 28, 1885 |
| 488,077 | Lamb | Dec. 13, 1892 |
| 574,115 | Schodorf | Dec. 29, 1896 |
| 668,487 | Cea | Feb. 19, 1901 |
| 688,325 | McQuade | Dec. 10, 1901 |
| 721,540 | Buckingham | Feb. 24, 1903 |
| 735,567 | McGowan | Aug. 4, 1903 |
| 866,003 | Davis | Sept. 17, 1907 |
| 877,947 | Pendleton | Feb. 4, 1908 |
| 1,015,239 | Miller | Jan. 16, 1912 |
| 1,235,483 | Johnston | July 31, 1917 |
| 1,274,727 | McCarty | Aug. 6, 1918 |
| 1,366,178 | Hatch | Jan. 18, 1921 |
| 1,394,783 | Olinger | Oct. 25, 1921 |
| 1,489,177 | VanTassel | Apr. 1, 1924 |
| 2,278,298 | Young | Mar. 31, 1942 |

FOREIGN PATENTS

| Number | Country | Date |
|---|---|---|
| 16,028 | Great Britain | 1892 |
| 710,385 | France | June 8, 1931 |